United States Patent Office 3,085,085
Patented Apr. 9, 1963

3,085,085
METHOD OF PREPARING POLYETHERS OF MONO AND DISACCHARIDES
Marco Wismer, Gibsonia, and James F. Foote, Sarver, Pa., assignors to Pittsburgh Plate Glass Company, a corporation of Pennsylvania
No Drawing. Filed May 3, 1960, Ser. No. 26,398
6 Claims. (Cl. 260—209)

This invention relates to an improved process for the preparation of polyether polyols by the reaction of alkylene oxides with saccharides such as sucrose or dextrose.

In a copending application, Serial No. 833,143, filed August 12, 1959, it is disclosed that sucrose can be reacted in the presence of water or steam with a low molecular weight alkylene oxide, such as ethylene oxide or propylene oxide, to give reaction products having a molecular weight in the range of about 700 to about 1800. These reaction products, which are complex polyether polyols, are liquid, and are readily compatible with isocyanates such as toluene diisocyanate with which they react to form rigid polyurethane foams having good properties with respect to strength, heat transfer and gas retention. These polyether polyols are particularly useful because they can be prepared utilizing cane or beet sugar as the sucrose source.

Insofar as can be ascertained, the replacement of the active hydrogen of the hydroxyl groups or sucrose by reaction thereof with an alkylene oxide results in a product whose main components have the following structure alkylene oxide component by the water utilized to form the reaction medium. The hydrolysis product of the alkylene oxide and other by-products formed have a deleterious effect on the final properties of the polyurethane foams prepared from such polyether polyols. For example, in many instances the presence of by-products in the polyether polyol will result in a foam having a non-uniform cell structure, with the foam having poor strength properties and being very friable. Also, the polyurethane foams prepared from polyether polyols containing substantial amounts of by-products will in most instances have a substantially lower percentage of closed cells (as opposed to open cells) with the result that the insulating properties of such a foam are relatively poor.

It has now been discovered that the formation of undesirable by-products in the reaction of alkylene oxides with sucrose and other saccharides such as dextrose, lactose and alpha-methyl d-glucoside with alkylene oxides can be minimized to a point where it is not deleterious in ultimate foam formation by carrying out the reaction by a unique method. In accordance with this method, the saccharide is dissolved in water, an oxyalkylation catalyst added, and the alkylene oxide addition carried out to that point at which the saccharide-alkylene oxide reaction product is a liquid at the reaction temperature. At this point, substantially all of the water present is removed by distillation or other means, and the balance of the alkylene oxide added until the desired polyether polyol is obtained. The resulting product consists predominantly

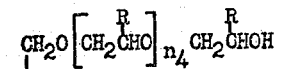
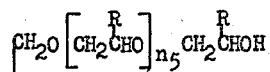
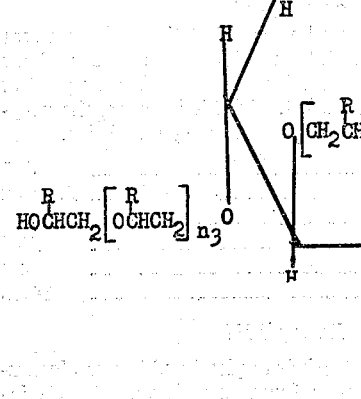
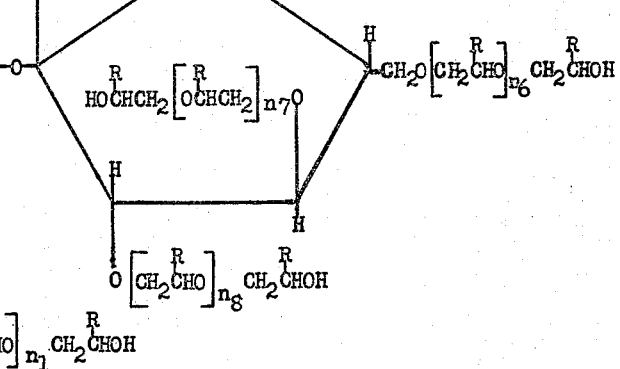

In the formula, R represents hydrogen or methyl ($-CH_3$), and $n_1$, $n_2$, $n_3$, $n_4$, $n_5$, $n_6$, $n_7$ and $n_8$ are whole numbers from 0 to about 8 with their sums being in the range of about 2 to about 18, depending upon the number of alkylene oxide molecules introduced. Some contiguous oxyalkanol groups on the sucrose skeleton may also be joined at their termini by condensation reactions to form side rings. Also, it is quite possble that some of the modified sucrose molecules may become linked together by condensation between terminal hydroxyls to produce polymers which contain two, three, or even four or five units of the sucrose molecules joined together by ether linkages. All of these effects may occur concurrently.

However, the process described in said copending application, Serial No. 833,143, suffers from the disadvantage that it is difficult to keep by-product formation at a minimum. In said process several undesirable side reactions occur readily, one involving the partial hydrolysis of the of desired polyether polyols having the structure depicted hereinabove, with only very minor amounts of undesirable by-products being formed. Also, the polyether polyol produced by this process is in most instances of a viscosity suitable for direct use in the machine formation of polyurethane foams without further decrease in viscosity by the addition of diluents being necessary.

In preparing the polyether polyols in accordance with the present invention, it is preferred to employ the alkylene oxide component in substantial excess of equivalency with respect to the hydroxyls of the saccharide component. For example, it has been found that excellent polyether polyols for use in the preparation of polyurethane resins, particularly foamed or cellulated polyurethane resins, are obtained by employing about 10 equivalents (moles) to about 25 equivalents (moles) of the alkylene oxide, as represented by propylene oxide or ethylene oxide or a mixture of these oxides, per mole of the saccharide.

Polyethers prepared utilizing such amounts will ordinarily possess molecular weights in the range of about 700 to about 1800.

The reaction between the alkylene oxide and the sucrose or other saccharide is carried out in the presence of water, which may be in the liquid state or may be present as water vapor or steam, dependent upon the temperature of reaction. The water and sucrose are used as a mixture, the term "mixture" including solutions, slurries and suspensions of water vapor and solid saccharide particles. The water will in most instances be utilized in an amount of about 5 percent to about 50 percent by weight based upon the total weight of water and the saccharides.

The temperature at which the reaction is carried out may be varied widely. However, in most instances it is desirable to react the alkylene oxide and the sucrose or other saccharide at temperatures of about 70° F. to about 270° F., or higher. If the temperature falls much below 70° F., the reaction time becomes excessively long, whereas temperatures substantially above 270° F. tend to favor hydrolysis of the alkylene oxide component to form the undesirable by-products referred to hereinabove.

In most instances, the reaction is carried out under pressure, though usually the pressure does not substantially exceed an average of about 80 pounds per square inch during most of the reaction. This, however, does not preclude at least short periods of higher pressure, for example, about 200 pounds per square inch or higher. Excessive pressures are undesirable, since such pressures increase the concentration of alkylene oxide in the solution.

As indicated above, it is desirable to carry out the reaction in the presence of an oxyalkylation catalyst. Suitable catalysts of this type include sodium hydroxide and potassium hydroxide, which are particularly preferred, calcium hydroxide, sodium carbonate, sodium acetate, sodium methoxide, and acids, such as boric acid or oxalic acid. While the amount of the oxyalkylation catalysts is not critical, the catalyst is generally employed in amounts of about 0.15 percent to about 10 percent by weight based upon the saccharide component of the mixture being reacted with the alkylene oxide.

While sucrose is the preferred saccharide for utilization in the process of this invention for obvious reasons of economy and availability, it is also possible to utilize other saccharides such as dextrose, lactose or alpha-methyl d-glucoside and the like with good results. In fact, the process can be utilized with any saccharide which requires water or other liquid reaction medium for the reason that like sucrose, it does not fuse or melt on heating, but instead simply chars when heated.

Ethylene oxide and propylene oxide have been found to be the most suitable oxides for the preparation of polyether polyols, and in some instances it is desirable to utilize mixtures of these oxides. However, it is also possible to employ other alkylene oxides such as butylene oxide, amylene oxide, or other lower alkylene oxides.

In carrying out the process of this invention, one preferred method consists in first dissolving the sucrose or other saccharide in an amount of hot water (120° F.–212° F.) to form a saturated solution, after which the oxyalkylation catalyst is added. Addition of the alkylene oxide is then begun and addition thereof continued until the saccharide-alkylene oxide reaction product is a liquid at the reaction temperature. This point can be readily ascertained by simple observation of the reaction mixture, and/or by experience with the reaction. In most instances, it has been found that this point is reached when about 4 moles to 8 moles of the oxide have been reacted with 1 mole of the saccharide component.

When the stage in the reaction has been reached where all of this initial amount of oxide has been added and reacted, the water is removed by distillation, centrifuging, decantation or other means. While it is desirable that all of the water be removed, this is a difficult result to achieve in practice and in most instances a small amount, normally less than about 10 percent will be present in the intermediate alkylene oxide-saccharide reaction product.

After the water is removed, the addition of the alkylene oxide is resumed and continued until the desired molar quantity is added. This point can readily be determined by weighing. The end of the reaction can readily be determined by reference to the pressure in the reactor, since a substantial drop in pressure occurs when the alkylene oxide has completely reacted. The final product preferably contains less than about 0.2 percent water.

The following examples illustrate the process for carrying out the preparation of polyether polyols by the reaction of alkylene oxides with sucrose and similar materials. The examples are not intended to limit the invention, however, for there are obviously many possible variations and modifications in the procedures described in the examples.

*Example I*

Ten and one-half (10½) pounds of sucrose were dissolved in 2.15 pounds of water and 0.26 pound of potassium hydroxide added thereto. The resulting mixture was maintained at about 215° F. and 10.7 pounds of propylene oxide added thereto over a period of 3 hours, during which time the temperature varied in the range of about 215° F. to 220° F. The propylene oxide was added at a feed pressure of 40 pounds per square inch gauge. Substantially all of the water was then removed by distillation, after which an additional 10.7 pounds of propylene oxide was added over a period of 1 hour and 45 minutes. A 93.2 percent yield of the desired polyether polyol was obtained. This polyether polyol had the following properties:

| | |
|---|---|
| OH value | 455.1 |
| Viscosity _____ centipoises | 140,000 |
| Percent water content | 0.05 |
| Percent solids | 96.5 |
| Final pH | 5.5 |
| By-product content | 8.40 |

*Example II*

Example I was repeated except that the entire amount of propylene oxide (21.4 pounds) was added without any of the water in the reaction mixture being removed at any time during the reaction. In this instance, the polyether polyol obtained had the following properties:

| | |
|---|---|
| OH value | 499 |
| Viscosity _____ centipoises | 260,000 |
| Percent water content | 0.165 |
| Percent solids | 96.3 |
| Final pH | 4.1 |
| Percent by-product | 16.83 |

*Example III*

The polyether polyols of Examples I and II were formulated into a polyurethane foam as follows: In each instance a prepolymer was formed utilizing 20 parts by weight of the polyether polyol and 80 parts by weight of an 80/20 mixture of toluene diisocyanate isomers. This prepolymer formed one component of the foamed mixture. The second component consisted of the following formulation:

(A)

| | |
|---|---|
| Polyther polyol of Example I | 60.8 grams. |
| Water | 2.0 parts by weight. |
| Emulsifier (X–521; Union Carbide) | 1 part by weight. |
| Catalyst (tin octoate) | 0.5 gram. |

(B)

| | |
|---|---|
| Polyether polyol of Example II | 57.8 grams. |
| Water | 2.0 parts by weight. |
| Emulsifier (X–521; Union Carbide) | 1 part by weight. |
| Catalyst (trimethyl ethylene diamine) | 0.9 part by weight. |

In each case a foam formed by admixing the prepolymer with the second component whereupon foam formation occurred. The foams were cured for about 20 minutes at 150° F. after which they had the following properties:

| Property | Foam From Polyether of Example I | Foam From Polyether of Example II |
| --- | --- | --- |
| Percent Closed Cells | 80.8 | 67.2. |
| Cell Structure | Fine—Uniform | Large—Glassy. |
| Strength | Medium | Low. |
| Friability | do | High. |

In the above table the strength property of the foam is measured by resistance of the material to deformation by pressure of the hand or some object, and friability by rubbing a portion of the foam between the fingers of the hand. It is apparent from these examples that the foam prepared from the polyether polyol from which water is removed during the reaction has substantially better properties from the standpoint of closed cell content, cell structure, strength and friability than the foams prepared from the polyether polyols from which water is not removed until the end of the reaction by which the polyether is prepared.

*Example IV*

Examples I and II are repeated except that the propylene oxide is utilized in an amount of 19 moles per mole of sucrose, whereas in Examples I and II the ratio was 12 moles of propylene oxide to 1 mole of sucrose. The polyether polyol prepared by removing the water from the reaction mixture after approximately half of the propylene oxide had been added had a viscosity of 9700 centipoises and a by-product content of only 8.13 percent, whereas the polyether polyol prepared without removal of water during the reaction had a viscosity of 19,800 centipoises and a by-product content of 26.9 percent. Polyurethane foams were prepared from both of these polyether polyols and again the foam from the polyether polyol prepared from the two stage method was substantially stronger and less friable than the foam prepared from the polyether polyol obtained by the one stage method.

*Example V*

This example illustrates the utilization of two alkylene oxides in preparing a polyether polyol.

Two hundred ten (210) parts by weight of water and 25.1 parts potassium hydroxide were admixed in a glass reactor equipped with stirrer, thermometer and heating means. The resulting mixture was then heated gradually from room temperature (70° F.) to about 230° F., and during this heating period (1 hour and 20 minutes) 1025 parts (3.0 moles) of sucrose was added. The sucrose solution thus formed was charged into an autoclave, heated to a temperature of 230° F. and 1046 parts (18.0 moles) of propylene oxide were added into the sucrose solution during a period of 2 hours and 20 minutes, using a nitrogen feed pressure of 25 pounds per square inch gauge for the addition. Heating was continued for an additional hour.

At this point substantially all of the water was removed by distillation from the reaction mixture. To the remaining sucrose-propylene oxide reaction product there was then added over a period of 2 hours, at a temperature of 230° F.–240° F. and under a nitrogen feed pressure of 20 pounds per square inch gauge, 779 parts (10.8 moles) of butylene oxide. After the butylene oxide was added heating was continued for an additional hour, at the end of which time the reactor pressure had dropped to zero pounds per square inch gauge.

The reaction mixture was then neutralized with an ion exchange resin to a pH of 6.9. An 80 percent yield of the desired polyether polyol was obtained. This polyether polyol had the following properties:

Hydroxyl value _____ 440.9
Viscosity _____ cps__ 27,000–28,000
Percent by-product _____ 12.6
Percent water _____ 0.16

The polyether polyol prepared in accordance with this example was then reacted with toluene diisocyanate according to the method of Example III and a rigid foam having a high percentage of closed cells, a fine, uniform cell structure and low friability was obtained.

While the above examples illustrate the use of propylene oxide and butylene oxide and sucrose in the preparation of polyether polyols good results are also obtained when ethylene oxide is utilized alone with sucrose or in admixture with propylene oxide. Similarly, the sucrose can be replaced entirely or partially with other of the saccharides disclosed hereinabove, for example, dextrose, lactose, alpha-methyl d-glucoside and the like. Also, it is possible to use other widely varying ratios of the alkylene oxide and sucrose. To illustrate, useful polyether polyols are obtained when the ratio is 15 moles of alkylene oxide to 1 mole of the saccharide component or 25 moles of the alkylene oxide to 1 mole of the saccharide.

Although specific examples of the invention have been set forth herein, it is not intended to limit the invention solely thereto, but to include all of the variations and modifications included within the scope of the appended claims.

We claim:

1. In the method of preparing a polyether polyol by the reaction of a lower alkylene oxide with a saccharide selected from the class consisting of mono- and di-saccharides and in the presence of an oxyalkylation catalyst, the improvement which comprises forming an aqueous mixture of said saccharide, adding said alkylene oxide to said aqueous mixture in the presence of from about 0.15 percent to about 10 percent by weight of the oxyalkylation catalyst, based upon the weight of the saccharide component of said mixture until the saccharide-alkylene oxide reaction product is a liquid at the reaction temperature of from about 70° F. to about 270° F., discontinuing addition of the alkylene oxide, removing the water from the reaction mixture until the water content of the alkylene oxide-saccharide reaction product is less than about 10 percent by weight and then continuing addition of said alkylene oxide until the polyether polyol is formed.

2. In the method of preparing a polyether polyol having a molecular weight of about 700 to about 1800 by the reaction of about 10 moles to about 25 moles of a lower alkylene oxide per mole of sucrose, which comprises admixing the sucrose in water, adding to said mixture said lower alkylene oxide in the presence of from about 0.15 percent to about 10 percent by weight of an oxyalkylation catalyst, base upon the weight of the sucrose component of said mixture, until the sucrose-alkylene oxide reaction product is a liquid at the reaction temperature of from about 70° F. to about 270° F., and removing substantially all of the water present in the reaction mixture, and continuing the addition of the remainder of the alkylene oxide.

3. In the method of preparing a polyether polyol having a molecular weight of about 700 to about 1800 by the reaction of sucrose and lower alkylene oxides in an amount of about 10 moles to about 25 moles of alkylene oxide per mole of sucrose, under a pressure not exceeding about 200 pounds per square inch and at a temperature of about 70° F. to about 270° F., and in the presence of an oxyalkylation catalyst, the improvement which comprises forming a mixture of the sucrose and water, adding the lower alkylene oxide to said mixture in the presence of from about 0.15 percent to about 10 percent by weight of an oxyalkylation catalyst, based upon the weight of the sucrose component of said mixture, until the sucrose-lower alkylene oxide reaction product is a liquid at the reaction temperature of from about 70° F. to about 270° F., removing substantially all of the water from the reaction mixture, and adding the remainder of the lower alkylene oxide.

4. The method of claim 3 wherein the lower alkylene oxide is selected from the class consisting of ethylene oxide, propylene oxide, and mixtures of the two oxides.

5. The method of claim 4 wherein the water charged initially is utilized in an amount of about 5 percent to about 50 percent by weight based upon the total weight of the sucrose and water.

6. The method of claim 3 wherein the lower alkylene oxide is a mixture of propylene oxide and butylene oxide.

References Cited in the file of this patent

UNITED STATES PATENTS

| | | |
|---|---|---|
| 2,819,260 | Monson et al. | Jan. 7, 1958 |
| 2,945,024 | De Groote et al. | July 12, 1960 |